United States Patent
Baumgartner et al.

(10) Patent No.: US 6,690,733 B1
(45) Date of Patent: Feb. 10, 2004

(54) METHOD FOR DATA TRANSMISSION

(75) Inventors: Alfred Baumgartner, Schrobenhausen (DE); Hubert Braunwarth, Friedberg (DE); Robert Gold, Pfaffenhofen (DE); Frank Grosshauser, Muehlried (DE); Josef Kuttenreich, Poettmes (DE); Ralf Reichart, Aichach (DE); Gerhard Schilling, Aresin (DE); Wolfgang Schmid, Brunnen (DE); Werner Steiner, Schrobenhausen (DE); Janez Skedelj, deceased, late of Grossnoebach (DE), by Ivanka Skedelj, Joze Skedelj, legal representatives

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/460,219

(22) Filed: Dec. 13, 1999

(30) Foreign Application Priority Data

Dec. 11, 1998 (DE) .......................... 198 57 154

(51) Int. Cl.⁷ .................................... H04L 27/00
(52) U.S. Cl. ................... 375/259; 375/340; 375/224; 714/823; 714/820
(58) Field of Search .............. 375/259, 224, 375/257, 316, 377, 229, 220, 340; 714/715, 703, 799, 819, 820, 821, 822, 823

(56) References Cited

U.S. PATENT DOCUMENTS

| | | | | |
|---|---|---|---|---|
| 4,298,982 A | * | 11/1981 | Auerbach | 714/746 |
| 5,600,660 A | | 2/1997 | Wolf | |
| 5,696,777 A | * | 12/1997 | Hofsaess | 714/820 |
| 5,793,780 A | | 8/1998 | Strauss | |
| 5,960,038 A | * | 9/1999 | Mishima | 375/259 |
| 6,317,465 B1 | * | 11/2001 | Akamatsu et al. | 375/257 |
| 6,341,142 B2 | * | 1/2002 | Ducaroir et al. | 375/219 |

FOREIGN PATENT DOCUMENTS

| | | |
|---|---|---|
| DE | 1524009 | 7/1970 |
| DE | 4205776 | 4/1993 |
| DE | 19601836 | 8/1996 |
| JP | 62 10941 | 1/1987 |
| JP | 02113340 | 4/1990 |
| JP | 020140030 | 5/1990 |
| JP | 020252027 | 10/1990 |

* cited by examiner

Primary Examiner—Phoung Phu
(74) Attorney, Agent, or Firm—W. F. Fasse; W. G. Fasse

(57) ABSTRACT

In a method for data transmission in which the binary original data (D0, ..., Dm) is transferred from a transmitter to a unit of a receiver (1), selected preferably by means of a binary base address (A0, ..., An), preferably to a register (80, ..., 87), where the original data (D0, ..., Dm) and preferably also the base address (A0, ..., An) are transmitted through one or several data lines, the inverted original data (inversion data) (D0', ..., Dm') and preferably also the complementary base address (complementary address) (A0', ..., An', Ak) are transmitted by the transmitter.

The transmitted inversion data (D0', ..., Dm') and preferably the transmitted complementary address (A0', ..., An', Ak) are inverted in the receiver, the transmitted base address (A0, ..., An) and the transmitted original data (D0, ..., Dm) are compared with the inverted complementary address (A0', ..., An') and the inverted inversion data (D0', ..., Dm') bit serially (0, ..., n) and (0, ..., m) respectively in each case, or instead of inversion and subsequent comparison an EXOR operation is performed on the base address (A0, ..., An) and (D0, ..., Dm) with complementary address (A0', ..., An') and inversion data (D0', ..., Dm'). The transmitted original data (D0, ..., Dm) is transferred to the unit selected by means of the transmitted base address (A0, ..., An) only if all bit for bit comparisons result in agreement. This ensures error-free data transmission.

The method and the circuit arrangement are used in particular for data transmission in vehicle occupant protection system s between a central unit and vehicle occupant protection devices.

15 Claims, 2 Drawing Sheets

METHOD FOR DATA TRANSMISSION

BACKGROUND OF THE INVENTION

The invention relates to a method for data transmission in which the binary original data is transmitted from a transmitter to a unit of a receiver, preferably to a register, and where the original data is transmitted through one or several data lines.

In known data transmission processes, the exchange of data is bidirectional, takes place in parallel and is based on a transmission of original data and preferably a base address also through which the unit is selected. The transmission channel (data bus) can be selected here with any width. The original data is transmitted in multiplex mode on the same lines as the base address; the base address is sent first on the data bus and then the original data. By means of the base address, the unit is selected to which the original data is to be transmitted.

In order to check whether the original data and the base address have been transmitted without error, in JP 02-113340 a parity bit is added to each data word to be transmitted, and in DE 1524 009 or JP 62-010 941 several parity bits are added, allowing certain types of transmission faults to be identified. For specific applications, however, such as the triggering of airbag systems for example, a higher degree of reliability in data transmission must be assured.

Furthermore, in JP 02-140 030 for example, a method is described for monitoring transmission from a transmitter to a receiver by sending back to the transmitter the data inverted in the receiver and by making a comparison in the transmitter after having inverted the data once again.

For applications such as the triggering of airbag systems for example, where immediate measures are initiated in the receiver, this return transmission is however unsuitable because the receiver does not immediately recognize an error when data is received. An error in transmission can possibly result in immediate and risky incorrect reactions.

Similarly to the method of double inversion, it is also possible to gate the data inverted once with the inverted data by means of a logical EXOR operation, as proposed for example for a parity test in JP 02-113340.

Another known method is that of Manchester coding where the inverted bit is transmitted in addition to the bit to be transmitted, firstly in order to detect single bit errors in data transmission and secondly for recovery of the clock pulse.

Furthermore, the method of transmitting digital data messages on two data lines in parallel is known from DE 196 01 836 A1, where the two data lines carry signal levels that are inverted with respect to each other.

SUMMARY OF THE OF INVENTION

The data transmission method of the kind specified at the outset is improved inasmuch as higher transmission reliability is ensured in the transmission of data, i.e. a data word is transmitted reliably from one electronic unit to another and to the greatest possible extent free of error.

This is effected by also transmitting from the transmitter to the receiver the inverted original data, referred to below as "inversion data", and, in accordance with the further development in the Subclaims, an address that is complementary to the base address, referred to below as "complementary address", where the transmitted inversion data and the transmitted complementary address are inverted in the receiver, and where the transmitted base address and the transmitted original data are compared bit for bit with the inverted complementary address and the inverted inversion data, and/or an exclusive OR operation between original and inversion data and also between base and complementary address has led bit serially to a logical "one".

Only where there is full agreement bit for bit will the transmitted original data be transmitted to the unit selected by means of the transmitted base address. In particular, no additional channels are needed for check or parity bits. Only the data transmission rate or clock frequency vary.

In the data transmission method according to the present invention, the base address and original data are transmitted twice with each transmission operation, in particular with each write operation, namely as base address with original data and as complementary address, complementary to the base address, with inversion data (inverted original data). By inverting once again the transmitted complementary address and the transmitted inversion data, and by subsequently comparing with the transmitted base address and the transmitted original data, it can be ensured that each transmitted bit is received correctly with two voltage levels (e.g. 0 V and 5 V). Line faults or disturbances are thus recognized.

When writing data to a target unit, it is necessary to perform these two transmission operations because a minimum of errors in the data results is required at the write target. For the reading operation too, it is possible to reliably input each item of information with two electrical levels.

One form of transmission can be called a self-synchronizing safety concept because with each transmission step it is specified whether the address is a base address or a complementary address. If a program were to be interrupted by an interrupt after the first transmission operation, it would be readily possible in the interrupt routine to input into the target unit. An error would be identifiable only on continuing the normal program if the data is not accepted by the target unit after the second write operation. The entire write operation would then have to be repeated.

In this preferred development, an address bit or an address line is used for this purpose to distinguish between base address and complementary address. This loss of an address line or an address bit is more than compensated in this self-synchronizing safety concept by the high transmission reliability of safely transmitting a data word from one electronic unit to the other.

A preferred embodiment of the method is characterized by the base address, the original data and the complementary address being stored temporarily until they have been compared. The individual items of data can thus be transmitted serially, e.g. via a common bus system, and compared with each other only when, for example, the inversion data is also available.

In a further development of this embodiment, the complementary address is stored according to its most significant (complementary) bit at another place than the base address. The complementary bit of the complementary address allows the base address and the complementary address to be easily distinguished and dealt with differently; in particular, they can be put into temporary storage.

In a preferred embodiment, the most significant (complementary) bit of the complementary address can be used for address coding of the unit. By means of the complementary bit it can be ensured, for example, that when the unit can be driven only via a base address then only base addresses are used for address coding of the unit.

Another preferred embodiment is characterized by outputting in the form of original data and as inverted original data (inversion data) the data that is to be output from the unit selected by means of the base address. This also allows data to be exchanged between two or more units by means of a double transmission operation.

In a further development of this embodiment, the most significant (complementary) bit of the complementary address is used for inverting data that is to be output from a unit. By means of the complementary bit of the complementary address, the base address and the complementary address and also the associated data can easily be distinguished and dealt with differently; in particular, the original data can be output inverted as inversion data.

In a further preferred embodiment of the data transmission method, the base address, the original data, the complementary address and the inversion data are transmitted on a common data bus.

The circuit arrangement has a base address temporary storage in which the transmitted base address is temporarily stored, an address temporary storage in which the transmitted complementary base address (complementary address) is temporarily stored, a data temporary storage in which the transmitted original data is temporarily stored, an inverter which inverts the transmitted complementary address and the transmitted inversion data, and a comparator which compares bit serially in each case the transmitted base address with the inverted complementary address and the transmitted original data with the inverted inversion data.

The advantages stated above for the method can be achieved with this circuit arrangement.

In an especially preferred embodiment of the circuit arrangement, the inverter and the comparator are formed together by an (n+m)-multiple XOR circuit with AND circuit on the output side. This will lead to an OK signal at the only output of the AND circuit only when every XOR circuit is, for example, positive at its output, i.e. at "logical 1", to indicate that the compared data agree.

In another advantageous embodiment of the circuit arrangement, a selection device, in particular an address decoding device, is connected behind the address temporary storage to control the transmission of the original data to the unit selected via the base address. The unit corresponding to the base address can be chosen by means of this selection device, e.g. a demultiplexer.

A preferred further development of this embodiment is characterized by the selection device being preceded by an address inversion device which inverts the complementary address according to its most significant (complementary) bit.

In another embodiment of the circuit arrangement, a data inversion device is provided which outputs the data to be output from a unit selected by means of the base address in the form of original data under the base address and inversion data under the complementary address.

In an advantageous further development of this embodiment provision is made for the data inversion device being controlled by means of the complementary bit in such a way that the original data is output inverted as inversion data if the complementary bit is present.

In particular, this method and the circuit arrangement for data transmission can be applied in vehicle occupant protection systems between a central control unit and remote modules, in particular sensors and/or actuators, i.e. acceleration or precrash sensors such as distance warning radar, gas generators for airbags and belt tighteners and various distributed control units such as, for example, those for side collision recognition.

Further advantages of the invention are evident in the description and in the drawings. Equally, the features mentioned above and those given below can be applied in accordance with the invention each on its own or together with others or in any combination.

The embodiment revealed and described is not to be understood as a comprehensive listing; rather, it has an exemplary character in order to explain the invention.

DESCRIPTION OF THE PREFERRED EMBODIMENTS

The data transmission method will now be explained in more detail by considering as an example transmission with a 4-bit data bus 20 that has been designed for use in a vehicle occupant protection system.

In vehicle occupant protection systems, data transmission takes place between a central control unit and remote modules, in particular sensors and/or actuators, i.e. acceleration or precrash sensors such as distance warning radar, gas generators for airbags and belt tighteners and various distributed control units such as, for example, those for side collision recognition. In this example of embodiment, the various units of the receiver are registers in which specific functional features of the particular vehicle occupant protection system such as gain factors for sensor signals, release thresholds, seat occupancy statuses etc. are stored and can be modified.

It would also be possible to implement data transmission with optional data bus width in precisely the same manner.

Connected to this data bus 20 via a 4-bit port 2 is an application-specific integrated circuit (ASIC) 1 as receiver that displays the logical circuit diagram of the Figure. The transmitter, a microcontroller, is not shown in the Figures because its internal design is not considered in any detail. Control signals CS1, CS2, CS, AS, E, R/W, which are transmitted to ASIC 1 on the data bus 20, are used to drive ASIC 1. In the conventional way, CS stands for Chip Select, AS for Address Strobe, E for E Clock, and R/W for Read/Write.

Data transmission takes place from the microcontroller of the transmitter which puts this data and the addresses in multiplex mode onto data bus 20 and correspondingly picks them up.

The addresses and data to be transmitted are grouped together and transmitted twice in each case; the first time as base address A0, A1, A2 with original data D0, ..., D3, and the second time as complementary address A0', A1', A2' complementary to the base address A0, A1, A2 with inverted original data D0', ..., D3' (inversion data). In the example of embodiment, the addresses have been stipulated with 3 bits and the data with a width of 4 bits. Instead of a common 4-bit bus, a separate address and data bus could also be used. The number of clock cycles for the parallel transmission of the data would then halve from 4 to 2.

Figure 1:
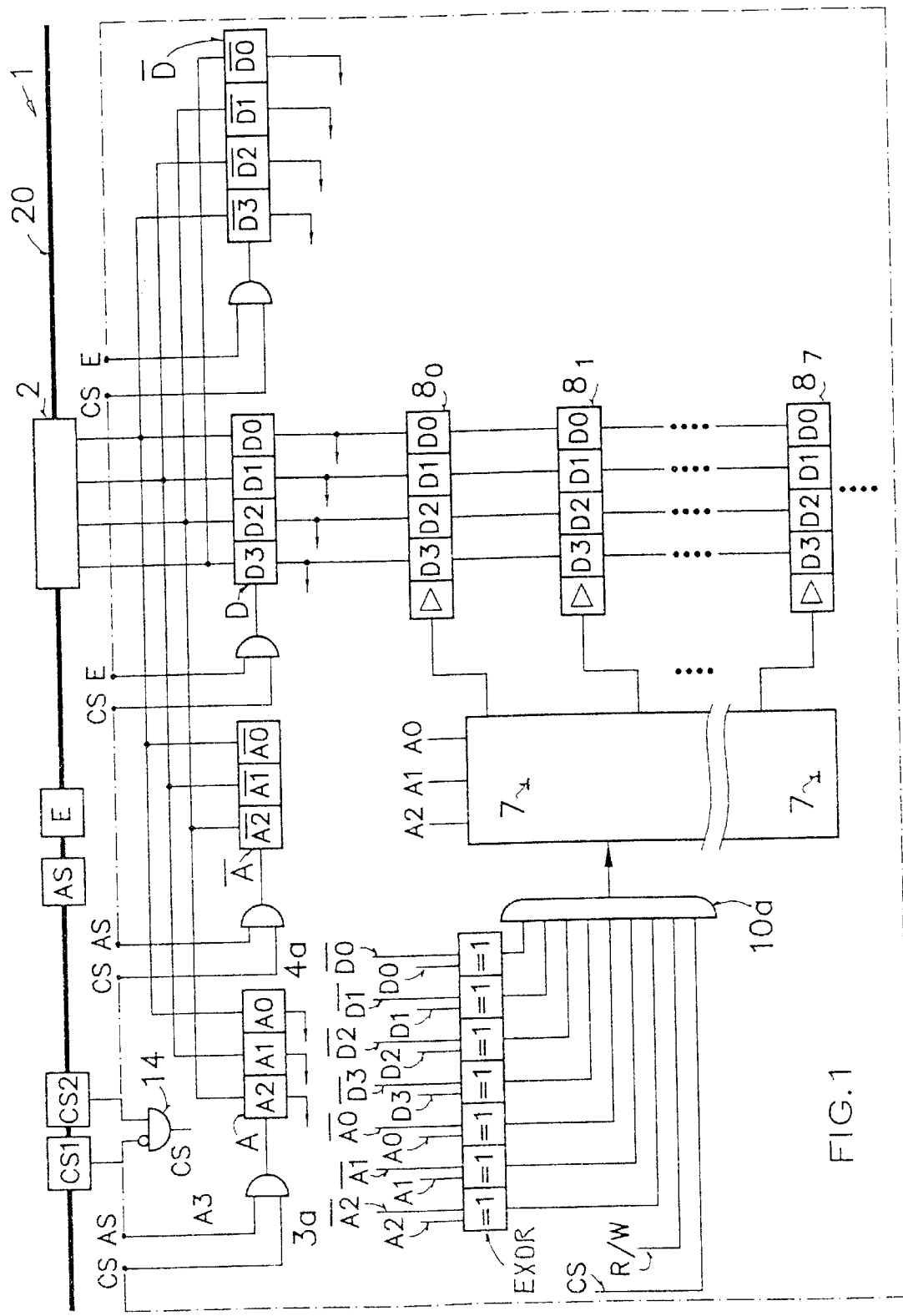
FIG. 1 Drawing of a suitable circuit arrangement without allowance for read access.

In FIG. 1, the temporary storage A has been provided for the base address A0, A1, A2, the temporary storage A' for the corresponding complementary addresses A0', A1', A2', the temporary storage D for the original data D0, . . . , D3, and the temporary storage D' for the inverted original data D0', . . . , D3' (inversion data).

The temporary storages A,A',D,D' are written one after the other with the respective level on the data bus, driven by the edges of AS, CS and E. Even at this point, it can be seen that with this circuit initially the more easily understood forced-synchronized process should be performed in which the sequence of data on the data bus 20 must be complete. A means of distinguishing between base address and complementary address has not yet been provided here.

In the EXOR block (EXOR), an exclusive OR operation is performed on the base address A0, A1, A2 with the complementary address A0', A1', A2' and also on the original data D0, . . . , D3 with the inversion data D0', . . . , D3'. If transmission is free of error, the result should then always be logical "1" so that at the following "AND" gate 10*a* of all EXOR outputs a "1" or a logical "High" level is also reached following which the multiplexer 7 receives the base address A0, A1, A2 and enables the input of the register block 8*x* corresponding to the base address so that this register block 8*x* is written with the available original data D0, . . . , D3.

Figure 2:
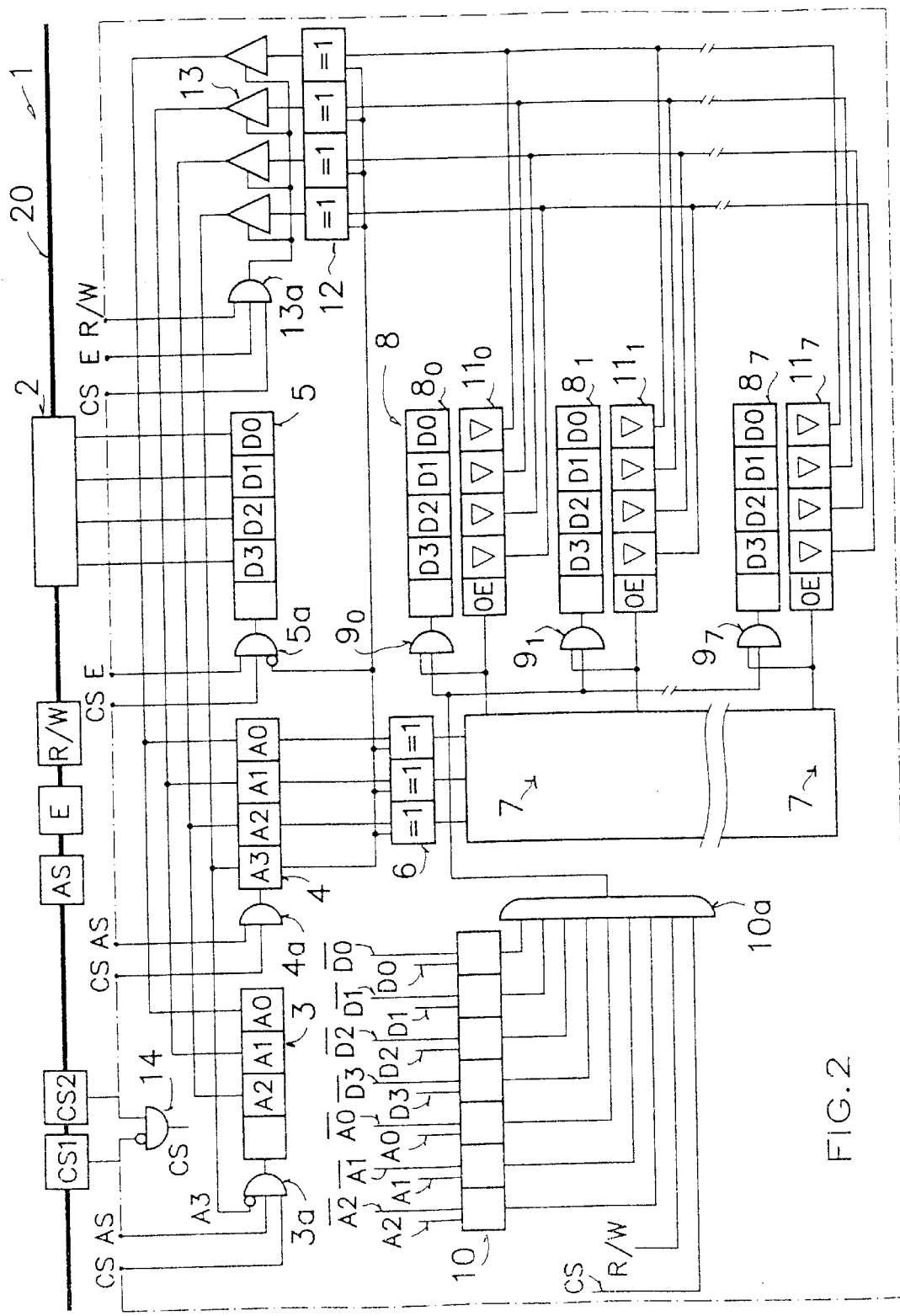
FIG. 2 Logical circuit diagram of a circuit arrangement with read and write access.

FIG. 2 shows an expanded circuit arrangement with read and write access and self-synchronization through the highest address bit A3/A3'.

Original data D0, . . . , D3 is written as follows into a register selected from eight registers 80, . . . ,87 in a register block 8: For example, the binary data value 1010b is to be written into the first register 80 with the base address 0001b. The first transmission step is performed with the following assembler instructions:

LDAA #$0A load accumulator A with original data: $0A=0000 1010b

STAA $4001 store accumulator at base address: $4001= 0100 0000 0000 0001b

With base address $4001, ASIC 1 is selected whose ChipSelect lines CS1, CS2 are connected to the address lines A15 and A14 (not shown), and a single CS signal is generated via an AND circuit 14 in ASIC 1. A15 is low-active and A14 high-active. The high nibble of the base address therefore has the value $4=0100b and the low nibble of the address points to the first register and has the value $1=0001b.

In the first cycle half of the first transmission operation, this base address is then transmitted with falling AS edge (AS="1") into two temporary address storages (address latch), namely into a temporary base address storage 3 (only the last three bits A0, A1, A2 of the base address) and into a temporary address storage 4 (all four bits A0, . A3(=0) of the base address. In the temporary base address storage 3, only a base address with the last three bits A0, A2, A3 can be stored here because in the base address the fourth address bit A3 is always "0" and only following an AND circuit 3*a* with inverted input for the fourth address bit A3 is the required transfer clock signal LE (Latch Enable) generated for the temporary base address storage 3. However, the transfer clock signal LE for the temporary address storage 4 is generated by AS and CS through an AND circuit 4*a*, i.e. independently of A3.

In a second cycle half, the original data D0, . . . , D3 at port 2 is transmitted with falling EClock signal (E="1") into temporary data storage 5. The transfer clock pulse for this temporary data storage 5 is generated by the logical AND circuit with the appropriate CS and E signals and when A3="0", i.e. only when there is a base address in the temporary address storage 4. The first half of the write operation is thus complete.

In the second transmission operation, the inversion data D0', . . . , D3' must be written to the complementary address A0, . . . , A2, A3(=1) and are made available to port 2 via data bus 20. Bit serial inversion of the data word $A 32 1010b results in the address $5=0101b. This value is transmitted to the complementary address $E=110b that is complementary to the base address. This is done, for example, with the assembler instructions:

LDAA $05 load accumulator A with original data: $05= 0000 1010b

STAA $400E store accumulator at base address: $400E= 0100 0000 0000 0001b

In the first cycle half of the second transmission operation, data is therefore again provided on data bus 1. The transmitted complementary address A0', . . . , A3' is now transmitted only to temporary address storage 4 because a complementary address is concerned whose most significant (complementary) bit A3 is always "1" and therefore no LE is generated for the temporary base address storage 3. The so-called self-synchronization is thus achieved.

This temporary address storage 4, in which all addresses can be input, is connected to a selection device 7 in the form of a 3-bit address decoder (demultiplexer) which is preceded by an address inversion device 6 with three XOR circuits as programmable inverters. Each XOR circuit is connected with the complementary bit A3 of the complementary address residing in the temporary address storage 4. Due to the bit serial inversion of bits A0', A1', A2' of the complementary address by the XOR circuits, only the base address A0, A1, A2 ever reaches the selection device 7. This then selects one of eight possible outputs, depending on the base address, leading to one of the eight registers 80 to 87 of register block 8.

In ASIC 1 there is in addition a comparator 10 to which the temporary base address storage 3, the temporary address storage 4, the temporary data storage 5 and the port 2 are connected; the necessary connecting lines are not shown here. The three bits of the base address A0, A1, A2 and the complementary address A0', A1', A2' as well as the four bits of the original data D0, . . . , D3 and the inversion data D0', . . . , D3' are supplied in pairs to one of seven XOR circuits in each case. Only when the base address agrees bit for bit with the inverted complementary address, or the original data with the inverted inversion data, will all seven XOR circuits of comparator 10 supply a "1" signal, resulting in a single "1" signal (OK signal) being generated from an AND circuit 10*a* that groups these signals together.

In the second cycle half of the second transmission operation, the inversion data D0', . . . , D3' is available at port 2 of ASIC 1 for a short time only. When this data is available for a short time, base address and original data are compared in the comparator 10 with complementary address and inversion data respectively. If each bit is present twice with different level, the active OK signal is generated at the output of the AND circuit 10*a*. This signal is connected to the corresponding transfer clock pulse of the selection device 7 for the selected register of the register block 8 via a corresponding AND circuit 90, . . . , 97. The selected register can thus accept the original data D0, . . . , D3 from the temporary data storage 5. The write operation is thus complete.

If, however, an error occurs during transmission, the comparator 10 and the AND circuit 10*a* supply no OK signal ("1") and the original data in the temporary data storage 5 cannot be written into the selected register, i.e. the transmitted original data to be stored is not accepted.

The time sequence of a write operation described above can therefore be outlined as follows:

$1^{st}$ write operation Base address into both temporary address storages, original data into the temporary data storage $2^{nd}$ write operation Complementary address only into the temporary address storage, inverted data briefly at ASIC port Comparison Comparison of address and data bits with complement Select register Select register through address decoder, copy original data from temporary data storage into selected register Only one bus cycle is needed for the read access operation. Register information can therefore be fetched into the microcontroller via the data bus 20 by means of a read instruction. However, reading can take place in two different ways: reading from the base address and reading from the complementary address. The following assembler instructions are needed for this:

LDAA $4001: Load accumulator A with original data of register $8_1$: $4001=0100 0000 0000 0001b LDAA $400E: Load accumulator A with inverted data of register $8_1$: $400E=0100 0000 0000 1110b The operation begins each time with transfer of the base address into the temporary address storage 4. The selection device 7 is then provided with the base address with the help of three XOR circuits as address inversion device 6, as described above, and selects the desired register 81. The data contained in this is enabled for readout by means of an OE (Output Enable) signal at an output driver 110, ... , 117 of the selection device 7. The temporary base address storage 3 is not required for the read operation.

Tristate drivers 13 and hence the connection to port 2 are activated by corresponding E and R/W signals. The data in the selected register 81 is now available at the bidirectional pins of port 2 or of ASIC 1 for collection by the microcontroller via data bus 20. When reading at the base address it receives the original data and when reading at the complementary address it receives the inverted data, because here too four XOR circuits as data inversion device 12 in front of the tristate outputs 13 invert the original data to inversion data because of the complementary bit A3 of the complementary address.

The time sequence of a read operation described above can therefore be outlined as follows:

Read operation Address only into the temporary address storage

Select register Select register through selection device

Tristate outputs Enable register data up to ASIC port, fetch data from microcontroller.

What is claimed is:

1. A method for data transmission, comprising the steps:
  a) transmitting a binary base address from a transmitter to a receiver;
  b) selecting a particular selected receiver unit in the receiver responsive to and dependent on the binary base address;
  c) preparing a complementary address as a complement of the binary base address, and transmitting the complementary address from the transmitter to the receiver;
  d) transmitting m binary original data in parallel through m data lines from the transmitter to the receiver;
  e) inverting the original data to prepare therefrom inversion data, and transmitting the inversion data from the transmitter to the receiver; and
  f) carrying out one of the following f1) or f2):
    f1) inverting the inversion data to prepare therefrom inverted inversion data and inverting the complementary address to prepare therefrom an inverted complementary address in the receiver, comparing the original data bit-serially with the inverted inversion data and comparing the binary base address bit-serially with the inverted complementary address, and providing the original data to the particular selected receiver unit in the receiver only if the original data corresponds bit-serially with the inverted inversion data and the binary base address corresponds bit-serially with the inverted complementary address, or
    f2) performing a bit-serial EXOR operation on the original data and the inversion data, performing a bit-serial EXOR operation on the binary base address and the complementary address, and providing the original data to the particular selected receiver unit in the receiver only if both of the bit-serial EXOR operations result in a logical "1" in each case.

2. The method in accordance with claim 1, wherein the original data is placed in temporary storage until it has been compared.

3. The method in accordance with claim 1, wherein the original data, the base address and the complementary address are placed in temporary storage until they have been compared.

4. The method in accordance with claim 3, wherein at least one bit in the base address and in the complementary address respectively has a different content, and further comprising distinguishing between the base address and the complementary address based on the different content.

5. The method in accordance with claim 4, wherein a most significant bit of the complementary address is used to invert the complementary address by performing an exclusive "OR" operation on this most significant bit with the other bits of the complementary address.

6. The method in accordance with claim 4, wherein the most significant bit of the complementary address is used to invert the original data which is output from the selected receiver unit.

7. The method in accordance with claim 1, further comprising outputting the original data and the inversion data from the selected receiver unit.

8. The method in accordance with claim 1, wherein the base address, the original data, the complementary address and the inversion data are transmitted on a common m-bit data bus.

9. A circuit arrangement of a receiver for receiving original data that is transmitted from a transmitter to a unit of this receiver selected by means of a base address, in order to perform the data transmission method in accordance with claim 1, comprising:
  a) a temporary base address storage, in which the base address is temporarily stored,
  b) a temporary complementary address storage, in which the complementary address is temporarily stored,
  c) a temporary data storage, in which the original data is temporarily stored,
  d) an inverter which inverts the complementary address and the inversion data, and
  e) a comparator which compares bit-serially respectively the base address with the inverted complementary address and the original data with the inverted inversion data.

10. The circuit arrangement in accordance with claim 9, wherein the inverter and the comparator are formed together by an (n+m)-multiple XOR circuit with an AND circuit on an output side thereof.

11. The circuit arrangement in accordance with claim 10, further comprising a selection device on an output side of the temporary address storage, which controls the transmission of the original data to the selected receiver unit.

12. The circuit arrangement in accordance with claim 11, further comprising an address inversion device which precedes the selection device and which inverts the complementary address in accordance with its most significant bit.

13. The circuit arrangement in accordance with claim 12, further comprising a data inversion device which outputs data to be output from the selected receiver unit as original data under the base address and as inversion data under the complementary address.

14. The circuit arrangement in accordance with claim 13, wherein the data inversion device is controlled by means of the most significant bit of the complementary address in such a way that, when the most significant bit exists, the inversion data is output.

15. Use of the method and the circuit arrangement in accordance with claim 9 for data transmission in vehicle occupant protection systems between a central unit and vehicle occupant protection devices.

* * * * *

UNITED STATES PATENT AND TRADEMARK OFFICE
CERTIFICATE OF CORRECTION

PATENT NO. : 6,690,733 B1  
DATED : February 10, 2004  
INVENTOR(S) : Baumgartner et al.

It is certified that error appears in the above-identified patent and that said Letters Patent is hereby corrected as shown below:

Title page,  
Item [57], ABSTRACT,  
Lines 1-29, cancel these lines and replace to read:

--Binary original data and a binary base address are transmitted through data lines from a transmitter to a receiver unit selected by the binary base address, whereby also inverted original data and a complementary base address are transmitted by the transmitter. The transmitted inversion data and complementary address are again inverted in the receiver, the transmitted base address and original data are compared with the inverted complementary address and the inverted inversion data respectively bit-serially, or instead of inversion and subsequent comparison, an EXOR operation is performed on the base address with the complementary address and on the original data with the inversion data. The transmitted original data is transferred to the receiver unit selected by the transmitted base address only if all bit-for-bit comparisons result in agreement. This ensures error-free data transmission.--.

Column 6,  
Line 6, after "word", replace "$A 32 1010b" by -- $A = 1010b --;  
Line 8, after "address", replace "$E = 110b" by -- $E = 1110b --.

Signed and Sealed this

Sixth Day of April, 2004

JON W. DUDAS  
*Acting Director of the United States Patent and Trademark Office*